(12) United States Patent
Plattner

(10) Patent No.: US 7,900,974 B1
(45) Date of Patent: Mar. 8, 2011

(54) METHOD AND APPARATUS FOR CONNECTING AIR CONDITIONING COOLANT LINES

(76) Inventor: Wesley M. Plattner, Tipton, MI (US)

( * ) Notice: Subject to any disclaimer, the term of this patent is extended or adjusted under 35 U.S.C. 154(b) by 112 days.

(21) Appl. No.: 11/725,012

(22) Filed: Mar. 16, 2007

(51) Int. Cl.
*F16L 25/00* (2006.01)

(52) U.S. Cl. ...................................... 285/332.1; 285/342

(58) Field of Classification Search .................. 285/249, 285/342, 343, 332.2, 332.1
See application file for complete search history.

(56) References Cited

U.S. PATENT DOCUMENTS

| | | | |
|---|---|---|---|
| 546,906 A | 9/1895 | Sexton | |
| 2,394,351 A * | 2/1946 | Wurzburger | 285/341 |
| 2,452,276 A * | 10/1948 | Woodling | 277/622 |
| 2,452,277 A | 10/1948 | Woodling | |
| 2,466,526 A | 4/1949 | Wolfram | |
| 2,761,704 A * | 9/1956 | Crawford | 285/331 |
| 3,265,412 A | 8/1966 | Reid et al. | |
| 3,437,357 A * | 4/1969 | Rubin | 285/55 |
| 3,708,186 A | 1/1973 | Takagi et al. | |
| 3,986,736 A | 10/1976 | Takagi et al. | |
| 4,138,145 A | 2/1979 | Lawrence | |
| 4,832,379 A | 5/1989 | Smith et al. | |
| 5,217,261 A | 6/1993 | DeWitt et al. | |
| 5,332,269 A * | 7/1994 | Homm | 285/39 |
| 5,351,998 A | 10/1994 | Behrens et al. | |
| 5,560,661 A | 10/1996 | Babel et al. | |
| 5,954,375 A * | 9/1999 | Trickle et al. | 285/342 |
| 6,450,553 B1 | 9/2002 | Suresh | |
| 6,488,318 B1 | 12/2002 | Shim | |
| 6,505,860 B2 | 1/2003 | Trichard | |
| 6,702,336 B1 | 3/2004 | Chelchowski et al. | |
| 6,834,524 B2 | 12/2004 | Johnston | |
| 6,988,746 B2 | 1/2006 | Olson | |
| 7,090,256 B2 | 8/2006 | Inoue | |
| 7,240,929 B2 * | 7/2007 | Williams et al. | 285/342 |
| 2006/0138772 A1 * | 6/2006 | Galante et al. | 285/249 |

\* cited by examiner

*Primary Examiner* — David E Bochna
(74) *Attorney, Agent, or Firm* — Young Basile Hanlon & MacFarlane, P.C.

(57) ABSTRACT

A method and apparatus for connecting air conditioning coolant lines. The apparatus comprises a coupler body, a coolant line, a flexible annular seal, a nut, and a deformable annular retainer. The coupler body has a passageway extending therethrough and a coolant line is disposed at least partially within the passageway. A flexible annular seal is disposed within the passageway in the coupler body for sealingly engaging the coolant line. The nut receives the coolant line therein and threadably engages the coupler body. A deformable annular retainer is disposed on the coolant line for engagement with the nut and the coupler body, wherein the threadable engagement of the nut with the coupler body urges the deformable annular retainer into a sealing engagement with the coupler body and the coolant line. The method includes swaging a deformable annular retainer to a coolant line, providing a nut on the coolant line, providing a coupler body having a passageway and a flexible annular seal disposed within the passageway, engaging the coolant line with the flexible annular seal to create a first seal, engaging the coupler body with the deformable annular retainer to create a second seal, and tightening a threaded engagement of the nut and the coupler body.

6 Claims, 3 Drawing Sheets

METHOD AND APPARATUS FOR CONNECTING AIR CONDITIONING COOLANT LINES

FIELD OF THE INVENTION

The present invention relates to the field of connecting air conditioning coolant lines, and more particularly, the present invention relates to a method and apparatus for connecting air conditioning coolant lines on aircraft.

BACKGROUND OF THE INVENTION

Connecting air conditioning coolant lines on aircraft poses significant difficulty. In non-aircraft applications, air conditioning coolant lines are typically fabricated from copper and aluminum, and thus, such aircraft coolant lines are commonly welded together. However, air conditioning coolant lines on aircraft cannot be welded on an aircraft due to the risk of fire or explosion. Furthermore, installation and connection of air conditioning coolant lines is difficult due to the tight spaces that are provided to such coolant lines on aircraft.

Typically, air-conditioning coolant lines require sealed couplings and fittings which require tightening with various tools. However, the tight spaces provided on aircraft make it difficult for the installers to tighten such couplings and fittings with their tools. Although flares or fittings are useful for similar applications, they have proven ineffective for aircraft cooling systems due to the leaking of such flares and fittings caused by small molecules provided in the coolant.

It would be desirable to provide an apparatus for connecting air conditioning coolant lines on an aircraft that does not require tightening through the use of tools. It would also be desirable to provide an apparatus for connecting air conditioning coolant lines on an aircraft that was not susceptible to leaking.

BRIEF SUMMARY OF THE INVENTION

The present invention provides a method and apparatus for connecting air conditioning coolant lines on aircraft. The apparatus for connecting air conditioning coolant lines of the present invention provides a coupler body, a coolant line, a flexible annular seal, a nut, and a deformable annular retainer.

The coupler body has a passageway extending therethrough. A chamfered engagement surface is formed in the coupler body adjacent to the passageway for complementarily engaging the deformable annular retainer. An annular groove is formed in the coupler body adjacent to the passageway and axially inward of the chamfered engagement surface. The coolant line is disposed at least partially within the passageway in the coupler body, and the flexible annular seal is disposed within the annular groove in the coupler body for sealing engagement with the coolant line.

The nut has a first inner periphery portion and a second inner periphery portion, as well as a radially extending shoulder. The first inner periphery portion slidably engages the coolant line. The second inner periphery portion is radially spaced from the coolant line to define an annular recess. Additionally, the second inner periphery portion of the nut threadably engages the outer periphery of the coupler body.

A deformable annular retainer is disposed within the annular recess for engagement with the nut, the coolant line, and the coupler body. The deformable annular retainer has at least a first engagement surface that complementarily engages the chamfered engagement surface of the coupler body, and at least a second engagement surface that complementarily engages the radially extending shoulder of the nut. Engagement of the nut with the coupler body urges the deformable annular retainer into sealing engagement with the coupler body and the coolant line. The deformable annular retainer may have a front ferrule and a back ferrule, wherein the first engagement surface is disposed on the front ferrule, the second engagement surface is disposed on the back ferrule, and the front ferrule and the back ferrule engage one another.

The method for connecting air conditioning coolant lines of the present invention includes swaging a deformable annular retainer to the outer periphery of an air conditioning coolant line on an aircraft, providing a nut on the air conditioning coolant line, and providing a coupler body having a passageway extending therethrough and a flexible annular seal disposed within the passageway. The method further includes engaging the air conditioning coolant line with the flexible annular seal to create a first seal between the coupler body and the coolant line, engaging the coupler body with the deformable annular retainer to create a second seal between the coupler body and the coolant line, and tightening a threaded engagement of the nut and the coupler body to maintain engagement of the coupler body and the deformable annular retainer.

BRIEF DESCRIPTION OF THE DRAWINGS

The description herein makes reference to the accompanying drawings wherein like referenced numerals refer to like parts throughout several views and wherein.

DETAILED DESCRIPTION OF THE INVENTION

Figure 1:
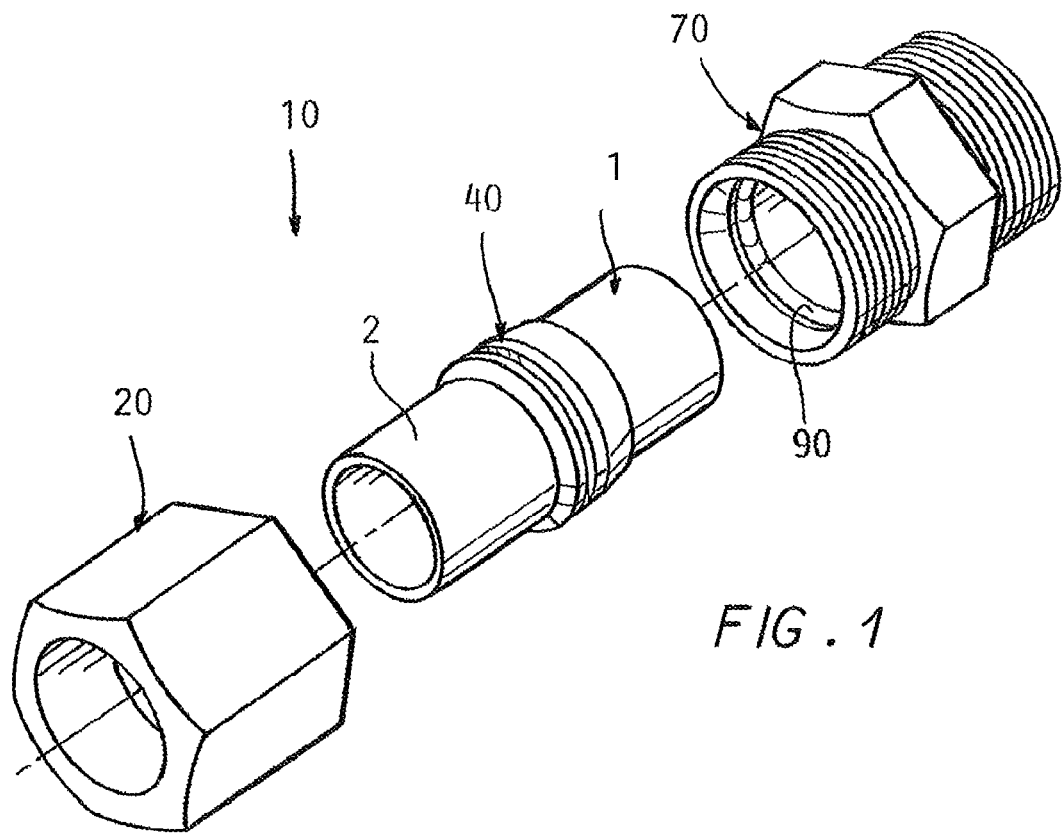
FIG. 1 is a perspective view of the apparatus for connecting air conditioning coolant lines of the present invention.

Referring to the drawings, the present invention will now be described in detail with reference to the preferred embodiment.

FIG. 1 shows a coupling apparatus or coupler 10 for connecting air conditioning coolant lines of the present invention. Although the present invention allows for the non-welded connection of air conditioning coolant lines in restricted spaces and is thus ideally suited for use on aircraft, the present invention is not limited to aircraft coolant lines, but rather, the present invention may be utilized in any application where air conditioning coolant lines are being connected, space is restricted, and welding is prohibited. The coupler 10 includes a coupler body 70 having a flexible annular seal or o-ring 90 mounted therein for creating a first seal between the coupler body 70 and an aircraft coolant line 1. The present invention also provides a deformable annular retainer 40 and a nut 20 that cooperate to both secure the coupler body 70 with respect to the aircraft coolant line 1 and create a second seal between the coupler body 70 and the aircraft coolant line 1. In this manner, the o-ring 90 and the deformable annular retainer 40 provide supplementary seals in case one of them is damaged. The coupler 10 of the present invention has a disengaged position, wherein the coupler body 70 is not sealed with respect to the aircraft coolant line 1, and an engaged position, wherein the coupler body 70 is sealed with respect to the aircraft coolant line 1 so that fluid, such as air conditioning coolant, may flow between the aircraft coolant line 1 and the coupler body 70 without leaking through the coupler 10.

To carry coolant through an aircraft air conditioning system, the aircraft coolant line 1 provides a thin-walled substantially tubular member that extends along a longitudinal axis 1a and has a substantially smooth, round outer periphery 2. The aircraft coolant line 1 is of a conventional design and may be fabricated from any suitable material, such as copper or aluminum.

Figure 2:
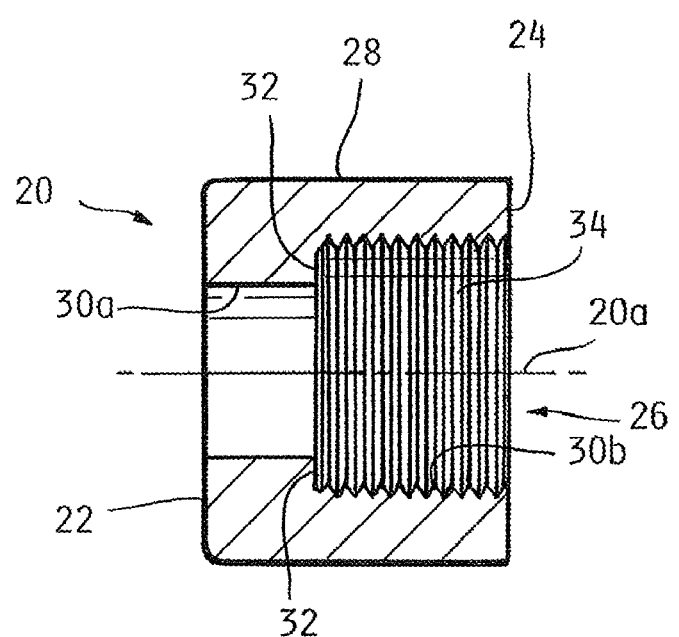
FIG. 2 is a sectional view of a nut of the apparatus for connecting air conditioning coolant lines of the present invention.

In order to secure the coupler body 70 to the aircraft coolant line 1, the nut 20 is designed to be slidably disposed around the outer periphery 2 of the aircraft coolant line 1. Accordingly, the nut 20 is substantially tubular, having an internal passageway 26 that extends along a longitudinal axis 20a between a first end 22 and a second end 24 of the nut 20, as shown in FIG. 2. An outer periphery 28 of the nut 20 allows for gripping or manipulation of the nut 20 either by hand or by using a tool (not shown). Accordingly, the outer periphery 28 of the nut 20 may be substantially hexagonal-shaped for engagement with a tool, such as a conventional wrench, or may be provided with other geometric or surface features to allow for enhanced engagement by a hand or by a tool.

The inner periphery of the nut 20 provides a first inner periphery portion 30a that is adjacent to the first end 22 of the nut 20 and a second inner periphery portion 30b that is adjacent to the second end 24 of the nut 20. The first inner periphery portion 30a has an internal diameter that is relatively smaller than the internal diameter of the second inner periphery portion 30b, and the first inner periphery portion 30a is separated from the second inner periphery portion 30b by a radially extending shoulder 32 that faces the second end 24 of the nut 20. At least part of the second inner periphery portion 30b of the nut 20 has a threaded portion 34 formed thereon for engagement with the coupler body 70, as will be explained in detail herein.

To secure the aircraft coolant line 1 to the coupler body 70, the deformable annular retainer 40 is a substantially annular member fabricated from a deformable material and designed to respond to axial force by deforming radially, which causes frictional engagement of the deformable annular retainer 40 with both the aircraft coolant line 1 and the coupler body 70. In this regard, it is important to note that the deformable annular retainer 40, namely the front ferrule 42 and the back ferrule 54, may slide with respect to the aircraft coolant line 1 when first assembled and prior to being swaged to the aircraft coolant line 1. As is well known to those skilled in the art, swaging is a process by which axial force is applied to one or more ferrules, causing the ferrules to deform radially and grip an adjacent rod, tube, or sleeve. Accordingly, swaging causes the deformable annular retainer 40 to bite into the aircraft coolant line 1, thus fixing the deformable annular retainer 40 in place with respect to the aircraft coolant line 1. Swaging of the deformable annular retainer 40 to the aircraft coolant line 1 may occur when the coupler 10 is first moved to the engaged position, or the deformable annular retainer 40 may be pre-swaged to the aircraft coolant line 1 using a swaging tool (not shown) designed for this purpose, as is well known to those skilled in the art. The deformable annular retainer 40 will be described herein as a two-part construction, having a pair of ferrules 42, 54. However, it is contemplated that a one-piece deformable annular retainer 40 could be provided.

Figure 3:
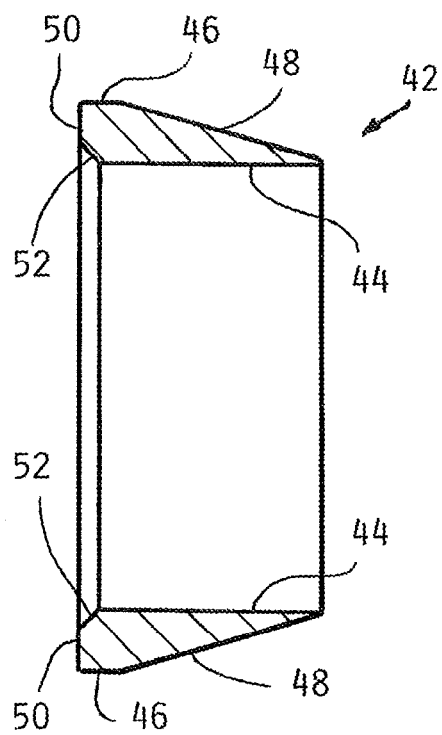
FIG. 3 is a sectional view of a front ferrule of the apparatus for connecting air conditioning coolant lines of the present invention.

The deformable annular retainer 40 includes a front ferrule 42, as shown in FIG. 3. The front ferrule 42 is a substantially annular member that is typically fabricated from a deformable metallic material. The front ferrule 42 has an inner periphery 44 and an outer periphery 46 wherein the inner periphery 44 is adapted to engage the outer periphery 2 of the aircraft coolant line 1. A slight exterior taper 48 is located adjacent to the outer periphery 46 of the front ferrule 42 and substantially adjacent to the inner periphery 44 of the front ferrule 42. The exterior taper 48 extends at an acute interior angle with respect to the inner periphery 44 of the front ferrule 42, thus creating a variable thickness cross-section for at least a portion of the front ferrule 42. The exterior taper 48 is adapted to act as an engagement surface for engagement with the coupler body 70. A radially extending rear face 50 of the front ferrule 42 is adjacent to the outer periphery 46 of the front ferrule 42 and extends substantially perpendicular thereto. An interior taper 52 extends at an obtuse angle with respect to both the rear face 50 and the inner periphery 44 of the front ferrule 42. This creates a small, variable width gap between the front ferrule 42 and the outer periphery 2 of the aircraft coolant line 1 toward the rear of the inner periphery 44 of the front ferrule 42. Both the rear face 50 and the interior taper 52 are adapted to act as engagement surfaces for engagement with the back ferrule 54.

Figure 4:
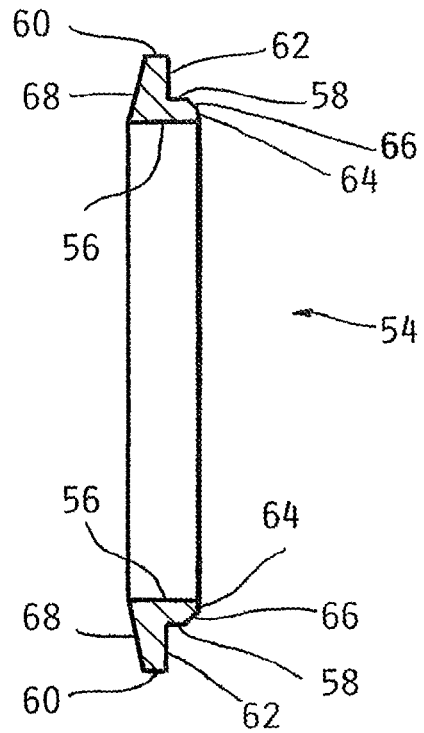
FIG. 4 is a sectional view of a back ferrule of the apparatus for connecting air conditioning coolant lines of the present invention.

The deformable annular retainer 40 also includes a back ferrule 54, as shown in FIG. 4. The back ferrule 54 is a substantially annular member fabricated from a deformable material, most typically a deformable metallic material, as similarly described with respect to the front ferrule 42. The back ferrule 54 has an inner periphery 56 and a stepped outer periphery having a first outer periphery portion 58 and a second outer periphery portion 60. In cross section, the inner periphery 56, the first outer periphery portion 58, and the second outer periphery portion 60 are substantially parallel. The second outer periphery portion 60 has a larger diameter as compared to the first outer periphery portion 58. The first and second outer periphery portions 58, 60 are separated by a radially extending shoulder 62 that is adjacent and substantially perpendicular to both the first outer periphery portion 58 and the second outer periphery portion 60. The radially extending shoulder 62 is adapted to act as an engagement surface for engagement with the rear face 50 of the front ferrule 42. Opposite the radially extending shoulder 62, a front face 64 is separated from the first outer periphery portion 58 by a chamfer 66 that forms obtuse interior angles with both the front face 64 and the first outer periphery portion 58. The front face 64 meets the inner periphery 56 of the back ferrule 54 substantially perpendicularly. Both the front face 64 and the chamfer 66 of the back ferrule 54 are adapted to act as engagement surfaces for engagement with the interior taper 52 of the front ferrule 42. Opposite the front face 64, a rear face 68 extends from the inner periphery 56 to the second outer periphery portion 60 of the back ferrule 54 at a slight angle or taper. The rear face 68 of the back ferrule 54 is adapted to act as an engagement surface for engagement with the radially extending shoulder 32 of the nut 20.

Figure 5:
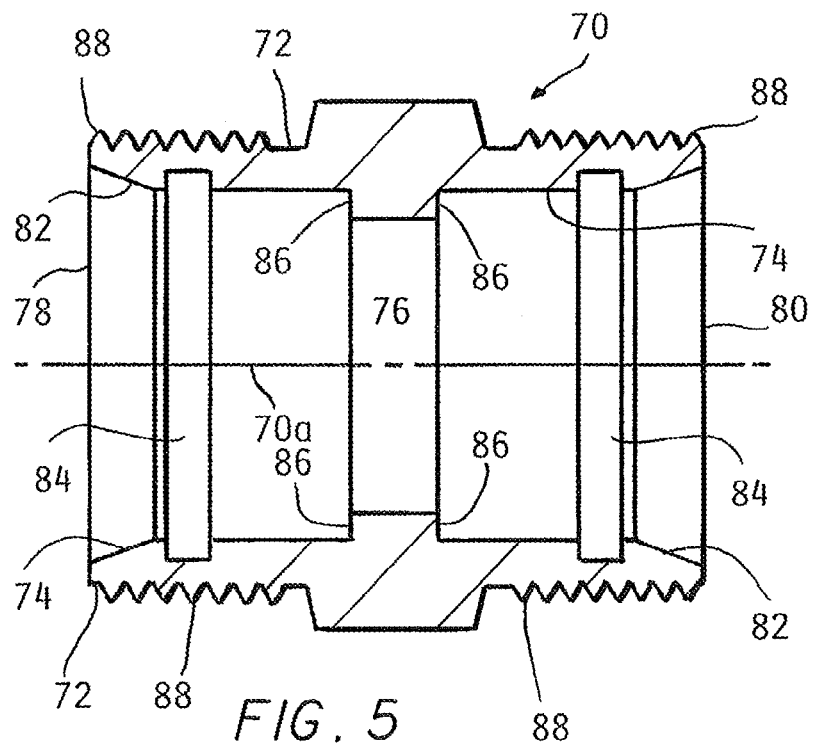
FIG. 5 is a sectional view of a coupler body of the apparatus for connecting air conditioning coolant lines of the present invention.

As best shown in FIG. 5, the geometry and size of the coupler body 70 are adapted to permit selective engagement of the coupler body 70 with the aircraft coolant line 1, the deformable annular retainer 40, and the nut 20. The coupler body 70 extends along a longitudinal axis 70a and has an outer periphery 72, an inner periphery 74, and a passageway 76 that is defined by the inner periphery 74. The coupler body 70 extends from a first end 78 to a second end 80 and is shown and described herein as substantially symmetrical about a plane perpendicular to its longitudinal axis, and thus, the coupler body 70 serves as a union coupler for joining the aircraft coolant line 1 to a second aircraft coolant line (not shown) at the opposite end of the coupler body 70 in a similar manner. However, the present invention is not necessarily limited in this manner, as it should be recognized that a single-ended coupler body 70 could be provided for use in other aircraft cooling system applications.

The outer periphery 72 of the coupler body 70 is sized so that it may be at least partially disposed within the nut 20. In particular, a screw thread 88 is provided on the outer periphery 72 of the coupler body 70 for threadingly engaging the screw thread 34 on the second inner periphery portion 30b of the nut 20. Accordingly, the nut 20 and the coupler body 70 may move between an unthreaded position, wherein the nut 20 and the coupler body 70 are threadingly disengaged, and a fully threaded position, wherein the screw thread 88 of the coupler body 70 is threadingly engaged with the screw thread 34 of the nut 20 to the greatest extent possible.

The inner periphery 74 of the coupler body 70 defines the passageway 76 in which the aircraft coolant line 1 is received. Near a midpoint between the first end 78 and the second end 80 of the coupler body 70, a shoulder 86 may be provided within the coupler body 70. The shoulder 86 is a constriction that defines an internal diameter smaller than the external diameter of the aircraft coolant line 1, and thus, the shoulder 86 controls the maximum insertion of the aircraft coolant line 1 into the coupler body 70. Between the shoulder 86 and first end 78 of the coupler body 70, the minimum internal diameter of the passageway 76 is at least as large as the outer periphery 2 of the aircraft coolant line 1.

To provide engagement of the coupler body 70 with the deformable annular retainer 40, a chamfered engagement surface 82 is formed in the inner periphery 74 of the coupler body 70 adjacent to the first end 78 of the coupler body 70. In particular, the chamfered engagement surface 82 is engageable with the exterior taper 48 of the front ferrule 42 of the deformable annular retainer 40. The chamfered engagement surface 82 provides the largest internal diameter for the passageway 76 adjacent to the first end 78 of the coupler body 70, and the internal diameter of the passageway 76 narrows toward the interior of the coupler body 70 throughout the length of the chamfered engagement surface 82.

Further inward on the inner periphery 74 of the coupler body 70 from the chamfered engagement surface 82, an annular groove 84 is formed in the inner periphery 74 of the coupler body 70. The annular groove 84 is sized so that the o-ring 90 may be disposed therein. The o-ring 90 is an elastic sealing ring, as well known in the art, and may have a substantially round cross-section, a substantially square cross-section, or some other suitable cross-sectional shape.

Figure 6:
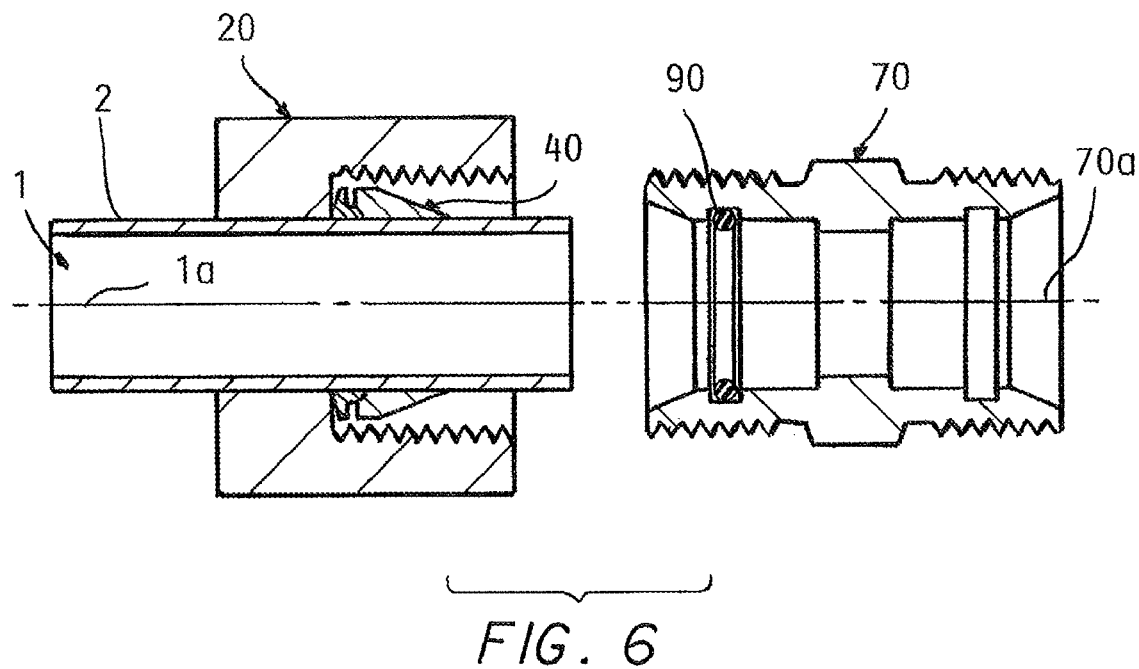
FIG. 6 is a sectional view of the apparatus for connecting air conditioning coolant lines of the present invention in a disengaged position.

In FIG. 6, the coupler 10 is shown in the disengaged position, wherein the coupler body 70 is not sealed with respect to the aircraft coolant line 1. Accordingly, the aircraft coolant line 1, the nut 20, and the deformable annular retainer 40 are at least pre-assembled but are not engaged with the coupler body 70 or the o-ring 90. In the disengaged position, the nut 20 is disposed on the aircraft coolant line 1, thereby defining an annular recess 36 between the outer periphery 2 of the aircraft coolant line 1 and the second inner periphery portion 30b of the nut 20 and extending from the second end 24 of the nut 20 to the radially extending shoulder 32 of the nut 20. The deformable annular retainer 40 is disposed on the aircraft coolant line 1 and within the annular recess 36, such that the radially extending shoulder 32 of the nut 20 abuts the rear face 68 of the back ferrule 54.

Figure 7:
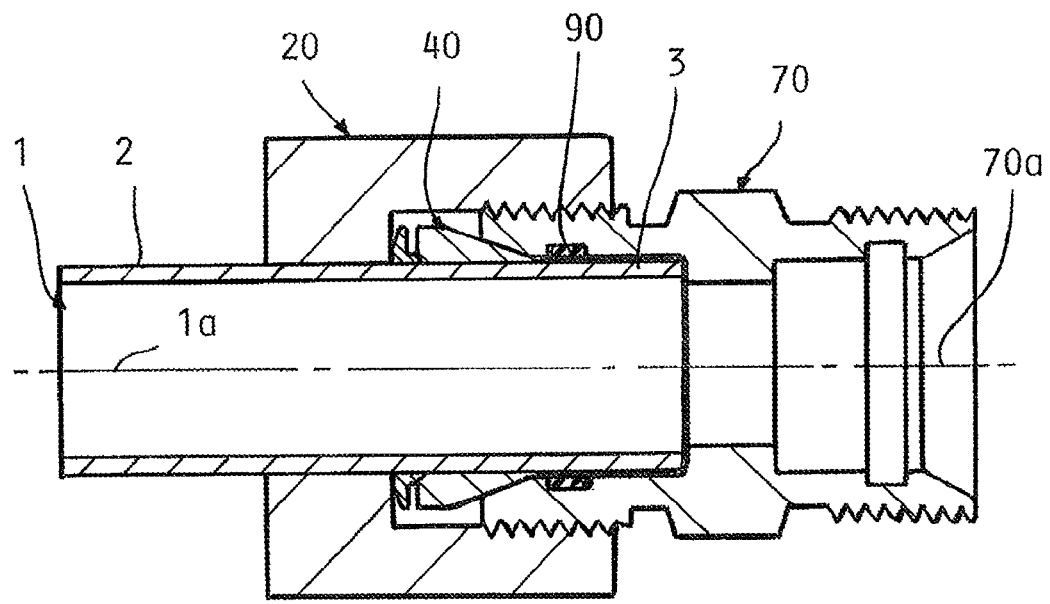
FIG. 7 is a sectional view of the apparatus for connecting air conditioning coolant lines of the present invention in an engaged position.

In FIG. 7, the coupler 10 is shown in the engaged position, wherein the coupler body 70 is sealed with respect to the aircraft coolant line 1 so that fluid, such as air conditioning coolant, may flow between the aircraft coolant line 1 and the coupler body 70 without leaking. In the engaged position, an end portion 3 of the aircraft coolant line 1 is at least partially disposed within the coupler body 70, and the o-ring 90 sealingly engages the inner periphery 74 of the coupler body 70 and the outer periphery 2 of the aircraft coolant line 1. The coupler body 70 is at least partially disposed within the annular recess 36 defined between the nut 20 and the end portion 3 of the aircraft coolant line 1, and accordingly, the screw thread 34 on the nut 20 is engaged with the screw thread 88 on the coupler body 70.

Comparing FIG. 6 to FIG. 7, movement of the coupler 10 from the disengaged position to the engaged position will be readily understood. In the disengaged position, the aircraft coolant line 1 and the coupler body 70 are positioned so that the longitudinal axis 1a of the aircraft coolant line 1 and the longitudinal axis 70a of the coupler body 70 are substantially aligned, so that the first end 78 of the coupler body 70 faces the second end 24 of the nut 20. The aircraft coolant line 1 is moved into the passageway 76 in the coupler body 70 and into sealing contact with the o-ring 90. The nut 20 is then engaged with the coupler body 70 by engaging the screw thread 34 on the second inner periphery portion 30b of the nut 20 with the screw thread 88 on the outer periphery 72 of the nut 20. As the nut 20 is threaded onto the coupler body 70, the coupler body 70 is drawn into the annular recess 36, and the chamfered engagement surface 82 on the inner periphery 74 of the coupler body 70 is drawn into engagement with the exterior taper 48 of the front ferrule 42. At the same time, the radially extending shoulder 32 of the nut 20 engages the back ferrule 54 and causes engagement of the front ferrule 42 and the back ferrule 54 with one another. In response to the axial compression placed upon them by the nut 20 and the coupler body 70, the front ferrule 42 and the back ferrule 54 deform radially, causing them to seal and frictionally engage the aircraft coolant line 1 and the coupler body 70.

In use, a user connects the aircraft coolant line 1 to the coupler body 70 by moving the coupler 10 from the disengaged position to the engaged position. The user first aligns the aircraft coolant line 1 with the coupler body 70 and then inserts the aircraft coolant line 1 into the passageway 76 until the aircraft cooling line 1 abuts the shoulder 86 of the coupler body 70, and the o-ring 90 engages the outer periphery 2 of the aircraft coolant line 1 with the o-ring 90 to create a first seal between the coupler body 70 and the aircraft coolant line 1. The user then threads the nut 20 onto the coupler body 70, moving the nut 20 to the fully threaded position with respect to the coupler body 70. In doing so, the user causes the front ferrule 42 and the back ferrule 54 of the deformable annular retainer 40 to engage the nut 20 and the coupler body 70, respectively, thereby swaging the deformable annular retainer to the aircraft coolant line 1 and creating a second seal between the coupler body 70 and the aircraft coolant line 1. Furthermore, the threaded engagement of the nut 20 and the coupler body 70 maintains engagement of the coupler body 70 and the deformable annular retainer 40.

Once in the fully engaged position, the aircraft coolant line 1 is sealed with respect to the coupler body 70 by both the o-ring 90 and the deformable annular retainer 40.

To return the coupler 10 to the disengaged position, the user moves the nut 20 to the unthreaded position and removes the aircraft coolant line 1 from the coupler body 70.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. An apparatus for connecting air conditioning coolant lines, comprising:
    a coupler body having a passageway extending therethrough;
    said coupler body having an annular groove formed therein adjacent to said passageway;
    said coupler body having a shoulder formed therein adjacent to said passageway;
    a coolant line disposed at least partially within said passageway, wherein said shoulder is engageable with said coolant line to limit a maximum insertion of said coolant line into said coupler body;
    a nut for receiving said coolant line and threadably engaging said coupler body;
    a deformable annular retainer disposed on said coolant line for engagement with said nut and said coupler body, said deformable annular retainer having an uninterrupted, substantially circular, ring-like shape, wherein said threadable engagement of said nut with said coupler body urges said deformable annular retainer into a sealing engagement with said coupler body and said coolant line by plastic deformation of said deformable annular retainer in a longitudinal direction and a radial direction with respect to said coupler body; and
    a flexible annular seal at least partially disposed within said annular groove of said coupler body for sealingly engaging said coolant line, wherein said annular groove and said flexible annular seal are spaced from said shoulder along said passageway.

2. The apparatus stated in claim 1, further comprising:
    said nut having a first inner periphery portion and a second inner periphery portion, wherein said first inner periphery portion slidably engages said coolant line and said second inner periphery portion is radially spaced from said coolant line to define an annular recess; and
    said deformable annular retainer disposed within said annular recess.

3. The apparatus stated in claim 1, further comprising:
    said deformable annular retainer having a tapered engagement surface formed thereon; and
    a chamfered engagement surface formed on said coupler body and defining a portion of said passageway for complementarily engaging said first engagement surface of said deformable annular retainer, said chamfered engagement surface defining a widest point of said passageway at an end of said coupler body such that at least a portion of said deformable annular retainer is disposed between said coupler body and said coolant line, wherein said tapered engagement surface of said deformable annular retainer and said chamfered engagement surface of said coupler body are substantially coplanar prior to deformation of said deformable annular retainer.

4. The apparatus stated in claim 1, further comprising:
    said nut having a stepped inner periphery forming a radial shoulder therein for engagement with said deformable annular retainer.

5. The apparatus stated in claim 1, further comprising:
    said deformable annular retainer fabricated from metal.

6. The apparatus stated in claim 1, said flexible annular seal further comprising:
    an o-ring.

* * * * *